(No Model.)
W. B. KEIGHTON.
PRINTER'S GAGE.
No. 355,537. Patented Jan. 4, 1887.
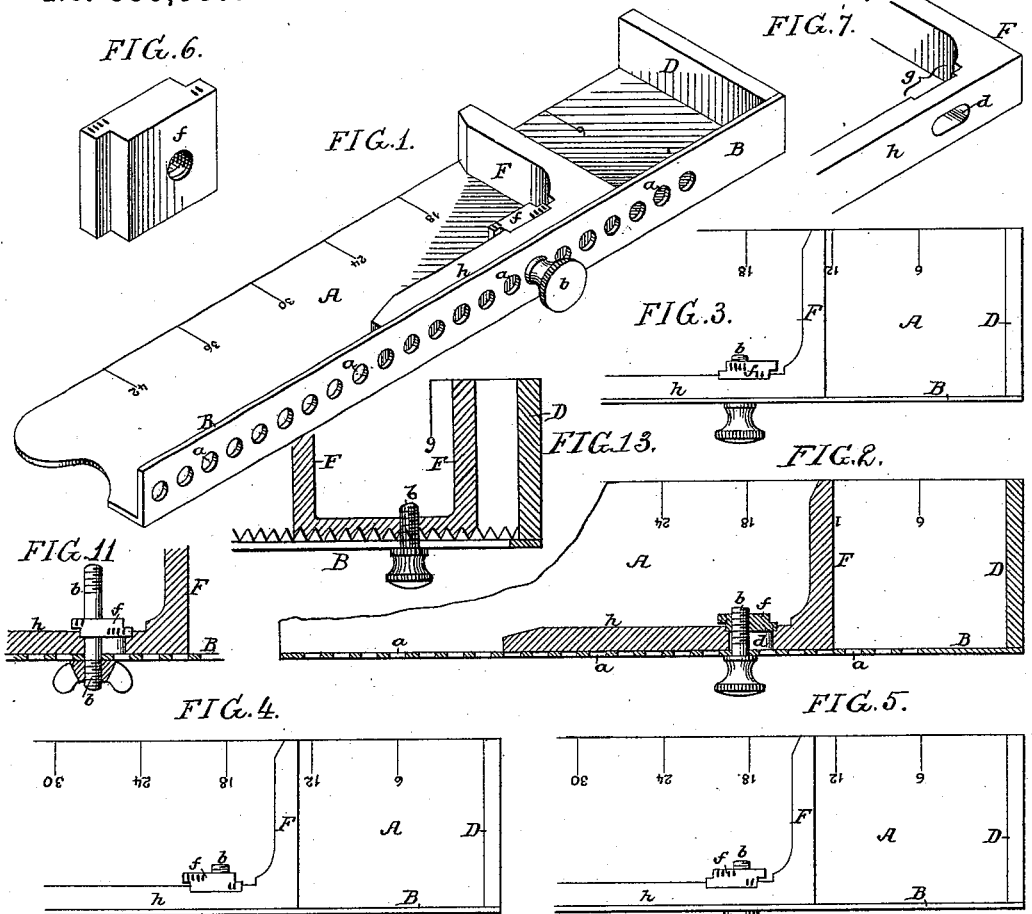
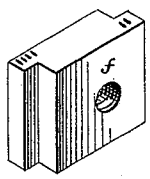
Witnesses:
Alex. Barkoff
William D. Conner
Inventor:
W. B. Keighton
by his Attorneys
Howson and Sons

UNITED STATES PATENT OFFICE.

WALTER B. KEIGHTON, OF CAMDEN, NEW JERSEY.

PRINTER'S GAGE.

SPECIFICATION forming part of Letters Patent No. 355,537, dated January 4, 1887.

Application filed June 3, 1886. Serial No. 203,993. (No model.)

*To all whom it may concern:*

Be it known that I, WALTER B. KEIGHTON, a citizen of the United States, residing in Camden, New Jersey, have invented certain Improvements in Printers' Gages, of which the following is a specification.

The object of my invention is to provide printers with a gage which can be set so as to accurately measure any desired number of ems, pica or nonpareil, and cannot be accidentally shifted or displaced after adjustment, and this object I attain in the manner hereinafter described, reference being had to the accompanying drawings, in which—

Figure 1 is a perspective view of a printer's composing-stick with adjustable gage constructed in accordance with my invention; Fig. 2, a plan view of the same, partly in section; Figs. 3, 4, and 5, plan views of part of the stick with the gage in different positions; Fig. 6, a perspective view of part of the gage on a larger scale than the other figures; Fig. 7, a perspective view of part of the knee of the stick; Fig. 8, a perspective view of a lead-cutter with gage in accordance with my invention; Figs. 9 and 10, diagrams showing said gage in different positions, and Figs. 11, 12, and 13 views illustrating modifications of my invention.

In Fig. 1, A represents the back plate, B the bottom flange, and D the end bar, of a printer's composing-stick, of which F is the adjustable knee, the distance between the face of said knee and the inner face of the end bar, D, of the stick determining the length of line in the matter which is being set up.

Instead of the usual longitudinal slot in the base-flange B of the stick, I form therein a row of openings, $a$, to any one of which may be adapted the screw-stem $b$, whereby the knee is secured in position. This screw-stem, however, is not, as usual, adapted to a threaded opening in the knee, but passes through an elongated slot, $d$, in the latter and is adapted at its inner end to a threaded opening in a block, $f$, which is constructed to fit snugly in a recess, $g$, in the base-flange $h$ of the knee.

The perforated base-flange B of the stick forms, in effect, a rack, and the stem $b$ constitutes a projection on the block $f$ for engagement with said rack. The distance from center to center of the openings $a$ of the rack is equal to two ems pica, so that a shifting of the stem $b$ from one opening of the rack to the next would effect an increase or decrease in the measure of space in the stick to the extent of two ems pica. In order, however, that this distance may be divided so as to permit an adjustment of the knee to the extent of but one-half em, one em, or one and one-half ems pica, equivalent to one, two, or three ems nonpareil, the gage-block $f$ is peculiarly constructed, the ends of said block forming steps 1, 11, 111, and 1111, and these steps bearing a certain relation to the stem $b$—that is to say, the step 1111 is farthest from the stem, the step 1 somewhat nearer thereto, the step 11 still nearer, and the step 111 closest to the stem. In consequence of this construction the knee of the stick can, by the adjustment of the gage-block $f$, be caused to assume any one of four positions without shifting the stem $b$ in the rack. For instance, if the knee is set to measure twelve ems pica, as shown in Fig. 2, the step 1111 of the block will occupy the front end of the recess $g$ in the base-bar $h$ of the knee; but if it is desired to adjust the latter so as to measure twelve and one-half ems pica, or twenty-five ems nonpareil, the gage-block is adjusted so that the step 1 of the same occupies the front end of the recess, as shown in Fig. 3, thus permitting a rearward movement of the knee to the extent of one-half em pica, or one em nonpareil.

If thirteen ems pica, or twenty-six ems nonpareil, are to be measured, the gage-block is adjusted to the position shown in Fig. 4, the step 11 occupying the front end of the recess $g$, and if thirteen and one-half ems pica, or twenty-seven ems nonpareil, are to be measured the gage is adjusted so that the step 111 of the same occupies the front end of the recess, as shown in Fig. 5. In order to measure fourteen ems pica the stem $b$ is adjusted to the next opening of the rack and the gage-block is adjusted to the position shown in Fig. 2—that is, with the step 1111 occupying the front end of the recess.

In applying my invention to a printer's lead-cutter—such, for instance, as shown in Fig. 8—I form on or apply to one edge of the bed A' of the machine a rack, B', having teeth $a'$, the distance apart from point to point of which is equal to one em pica, the gage-block $f'$ having teeth engaging with those of the rack B′, and one end, 5, of said gage-block being in line with the point of a tooth when said block is applied to the rack, while the opposite end, 6, of the gage-block is midway between the points of two teeth. Full ems pica can thus be measured by adjusting the gage to the position shown in Fig. 9, so that the end 5 forms the stop for the lead, while ems nonpareil or half ems pica can be measured by adjusting the gage to the position shown in Fig. 10, so that the end 6 forms the stop. Displacement of the gage-block is prevented by means of a flange, $m$, on the bed, said flange forming a rear bearing for the gage-block.

Although I have described the rack on the composing-stick as forming a two-em pica gage the distance from center to center of the openings of said rack should, in practice, be a very small fraction in excess of the exact measure of two ems pica in order that a line measuring any desired number of ems when set up will be slightly in excess of the exact length of the number of ems indicated, the excess in a line of seventy-six ems pica, for instance, being equal to, say, one em nonpareil. The object of this is to permit the ready introduction of leads cut to a certain gage into matter set to the same gage in the composing-stick.

In Fig. 11 I have shown a modified form of the gage-block $f$, having a duplex stem, $b$, forming part of the block and threaded at the ends for the reception of a confining-nut.

The object of making the rack on the composing-stick of two-em gage is to permit the use of a substantial stem, $b$, and prevent the weakening of the flange B by the placing of the openings closely together. If the base-flange is thick, however, this is not so important, and a single-em rack may be used, the gage-block in this case having plain ends in place of the stepped ends shown, but these ends being at different distances from the stem. The use of a multiplicity of teeth on the gage-block $f'$ is also a feature of minor importance, a single tooth, such as shown in Fig. 12, being available, but the use of a number of teeth being preferred.

The base-flange $h$ of the knee of the composing-stick may, if desired, have teeth engaging with a rack formed on the inner face of the base-flange of the stick, as shown in Fig. 13; but the plain base-flange and knee and the gage-block on the stem is a much simpler and cheaper construction, and for that reason is to be preferred.

It will be evident that when the gage is once set it cannot be accidentally displaced by rough handling of the stick, by too tight justification, or other means, and the gage can be changed from one measure to another with the assurance of absolute accuracy, and without the necessity of comparing the stick with a standard rule or setting up a line of quads of the proper length.

I claim as my invention—

1. The combination of a plate, table, bed, or other receptacle for printers' type, leads, &c., a rack the teeth or spaces of which bear a definite relation to the length of a pica em, as described, and a gage-block having a portion engaging with said rack, the opposite ends of said gage-block bearing different relations to the said engaging portion, whereby the reversal of the block effects a change in the measure, all substantially as specified.

2. The combination, in a printer's composing-stick, of the receptacle, a rack, an adjustable knee, a stem adapted to the rack, and a gage-block carried by said stem and adapted to a recess in the knee, all substantially as specified.

3. The combination, in a composing-stick, of the receptacle, a rack, the recessed knee, the stem adapted to the rack, and the gage-block carried by said stem and adapted to the recess in the knee, the opposite ends of the said gage-block bearing different relations to the stem, all substantially as specified.

4. The combination, in a composing-stick, of the receptacle, a rack, the recessed knee, the stem adapted to the rack, and a gage-block carried by said stem and adapted to the recess of the knee, each end of said gage-block forming steps, and each of said steps bearing a different relation to the stem, all substantially as specified.

In testimony whereof I have signed my name to this specification in the presence of two subscribing witnesses.

WALTER B. KEIGHTON.

Witnesses:
WILLIAM D. CONNER,
HARRY SMITH.